United States Patent
Haley et al.

(10) Patent No.: US 10,661,882 B2
(45) Date of Patent: May 26, 2020

(54) WING LOCK AND DISCONNECT MECHANISMS FOR A RC AIRCRAFT

(71) Applicant: HORIZON HOBBY, LLC, Champaign, IL (US)

(72) Inventors: James Haley, Champaign, IL (US); Mike McConville, Champaign, IL (US); Aaron Shell, Champaign, IL (US); Chris Huhn, Champaign, IL (US); Dustin Buescher, Champaign, IL (US)

(73) Assignee: Horizon Hobby, LLC, Champaign, IL (US)

( * ) Notice: Subject to any disclaimer, the term of this patent is extended or adjusted under 35 U.S.C. 154(b) by 166 days.

(21) Appl. No.: 15/692,524

(22) Filed: Aug. 31, 2017

(65) Prior Publication Data
US 2018/0057136 A1    Mar. 1, 2018

Related U.S. Application Data

(60) Provisional application No. 62/382,697, filed on Sep. 1, 2016.

(51) Int. Cl.
*B64C 1/26* (2006.01)
*A63H 27/00* (2006.01)
(Continued)

(52) U.S. Cl.
CPC ............. *B64C 1/26* (2013.01); *A63H 27/001* (2013.01); *B64C 39/024* (2013.01);
(Continued)

(58) Field of Classification Search
CPC .... A63H 27/001; B64C 1/26; B64C 2201/10; B64C 2201/102; B64C 2211/00;
(Continued)

(56) References Cited

U.S. PATENT DOCUMENTS

| | | | | |
|---|---|---|---|---|
| 3,935,664 A | * | 2/1976 | Neuhierl | A63H 27/001 446/34 |
| 4,611,822 A | * | 9/1986 | Bernhardson | A63C 9/20 280/615 |

(Continued)

FOREIGN PATENT DOCUMENTS

| | | | | |
|---|---|---|---|---|
| CA | 2945967 A1 | * | 4/2018 | ............... B64C 1/26 |
| EP | 0829650 A1 | * | 3/1998 | ............... F16B 2/22 |
| FR | 3073678 A1 | * | 5/2019 | ........... B64C 39/001 |

*Primary Examiner* — Joseph W Sanderson
(74) *Attorney, Agent, or Firm* — Baker Botts LLP

(57) ABSTRACT

A radio-controlled (RC) aircraft has a wing lock and disconnect mechanism. The RC aircraft has a structural member and a wing that disconnects from a fuselage. The RC aircraft has a lock mechanism, a wing structural member recess, a fuselage structural member recess, a lock recess, and an aperture. The lock mechanism couples to the wing and is adapted to fit within the lock recess of the fuselage. The wing structural member receives the structural member. The fuselage structural members recess corresponds to the wing structural member recess. The lock recess receives the lock mechanism. The wing disconnects from the fuselage by unlocking the lock mechanism. The structural member fits within the wing structural member recess and the fuselage structural member recess.

20 Claims, 4 Drawing Sheets

(51) Int. Cl.
*B64C 39/02* (2006.01)
*B64C 39/10* (2006.01)

(52) U.S. Cl.
CPC .. *B64C 2039/105* (2013.01); *B64C 2201/028* (2013.01); *B64C 2201/104* (2013.01); *B64C 2201/146* (2013.01); *B64C 2201/165* (2013.01); *B64C 2211/00* (2013.01)

(58) Field of Classification Search
CPC .. F16B 5/0016; F16B 5/126; Y10T 403/1616; Y10T 403/1624
See application file for complete search history.

(56) References Cited

U.S. PATENT DOCUMENTS

| | | | | |
|---|---|---|---|---|
| 5,202,172 A * | 4/1993 | Graf | ............... | F16B 5/123 24/292 |
| 5,699,601 A * | 12/1997 | Gilliam | ............... | B25B 27/00 29/278 |
| 5,779,190 A * | 7/1998 | Rambo | ............... | B64C 39/024 244/118.2 |
| 6,224,451 B1 * | 5/2001 | Lai | ............... | A63H 27/001 403/294 |
| 7,237,750 B2 * | 7/2007 | Chiu | ............... | A45C 13/02 244/119 |
| 7,811,150 B2 * | 10/2010 | Amireh | ............... | A63H 29/22 446/57 |
| 7,918,707 B2 * | 4/2011 | Amireh | ............... | A63H 27/02 446/57 |
| 7,922,115 B2 * | 4/2011 | Colgren | ............... | B64C 9/02 244/120 |
| 8,128,451 B2 * | 3/2012 | Frontera Castaner | ............... | A63H 27/001 446/34 |
| 8,201,776 B1 * | 6/2012 | Somenzini | ............... | A63H 27/001 244/123.5 |
| 8,939,810 B1 * | 1/2015 | Suknanan | ............... | A63H 27/02 446/34 |
| 9,150,301 B2 * | 10/2015 | Liu | ............... | B64C 3/56 |
| 2006/0091258 A1 * | 5/2006 | Chiu | ............... | A45C 13/02 244/119 |
| 2011/0117806 A1 * | 5/2011 | Frontera Castaner | ............... | A63H 27/001 446/34 |
| 2014/0008487 A1 * | 1/2014 | Liu | ............... | B64C 3/56 244/49 |
| 2015/0211556 A1 * | 7/2015 | Alexander | ............... | F16B 2/22 114/361 |
| 2019/0135424 A1 * | 5/2019 | Baity | ............... | B64C 11/46 |

* cited by examiner

WING LOCK AND DISCONNECT MECHANISMS FOR A RC AIRCRAFT

RELATED APPLICATIONS

This application claims priority to U.S. Provisional Application Ser. No. 62/382,697 filed Sep. 1, 2016, and which is incorporated herein by reference in its entirety.

FIELD

The present disclosure relates to systems and methods for a radio-controlled (RC) aircraft, such as a plane, helicopter, rotorcraft, or other aerial vehicle. More specifically, disclosed embodiments relate to wing lock mechanisms which allow a wing, or arm, of the aircraft to be connected or disconnected from the aircraft.

BACKGROUND

RC aircraft have been in operation for many years. In basic form, RC vehicles are self-powered model vehicles (e.g., planes, jets, helicopters, quadcopters, rotorcraft, and other aerial vehicles) that can be controlled from a distance using a specialized transmitter (or controller). For example, a transmitter may be used to control the control surfaces (e.g., blade pitch, ailerons, flaps, elevators, throttle, yaw, roll, pitch) of an RC aircraft.

RC pilots often fly aircraft at locations that require the aircraft to be stored and transported. Thus, a need exists to efficiently store or transport RC aircraft.

SUMMARY

In some embodiments, a RC aircraft includes a structural member. The RC aircraft includes a wing configured to disconnect from a fuselage. The wing includes a lock mechanism coupled to the wing and adapted to fit within a lock recess of the fuselage, and a wing structural member recess configured to receive the structural member. The fuselage includes a fuselage structural member recess that corresponds to the wing structural member recess, a lock recess adapted to receive the lock mechanism; and an aperture adapted to provide access to the lock mechanism. The wing is disconnected from the fuselage by unlocking the lock mechanism. The structural member is adapted to fit within the wing structural member recess and the fuselage structural member recess.

In some embodiments, a radio-controlled (RC) aircraft includes a removable wing. The RC aircraft includes a snap-fit locking mechanism coupled to the removable wing and a fuselage. The RC aircraft includes a structural member coupled to the removable wing and the fuselage. The RC aircraft includes an aperture adapted to provide access to the snap-fit lock mechanism. The RC aircraft includes a stabilizing mechanism that includes a stabilizing protrusion on either the wing or the fuselage, and a corresponding stabilizing recess, on the other of the wing or the fuselage, adapted to receive the stabilizing protrusion when the wing is connected to the fuselage. The wing is disconnected from the fuselage by applying a force to the snap-fit locking mechanism.

In some embodiments, a radio-controlled (RC) includes a structural member. The RC aircraft includes a fuselage with a lock mechanism adapted to fit within a lock mechanism recess of the wing and a fuselage structural member recess. The RC aircraft includes a wing configured to disconnect from a fuselage. The wing includes the lock mechanism recess, a wing structural member recess configured to receive the structural member and that corresponds to the fuselage structural member recess, and an aperture adapted to provide access to the lock mechanism. The wing is disconnected from the fuselage by unlocking the lock mechanism. The structural member is adapted to fit within the wing structural member recess and the fuselage structural member recess.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

RC aircraft often need to be stored or transported. During storage and transport, there is a need to have modular wings, or arms. The modular wings need to be able to lock in place to ensure safe and stable flight characteristics during flight, as well as easily disconnect for storage or transport. According to embodiments of the invention, the wings of a RC aircraft can be locked in place or disconnected by simply disengaging a lock mechanism, such as a push-button locking system. The modular wings also provide a technical benefit by making it easier to repair or replace a damaged wing, rather than having to replace the entire airframe.

Example embodiments described herein are not meant to be limiting. For example, wing and fuselage components (such as a protrusion on one and a recess on the other, or a locking mechanism on one and a recess on the other) may be reversed.

Figure 1:
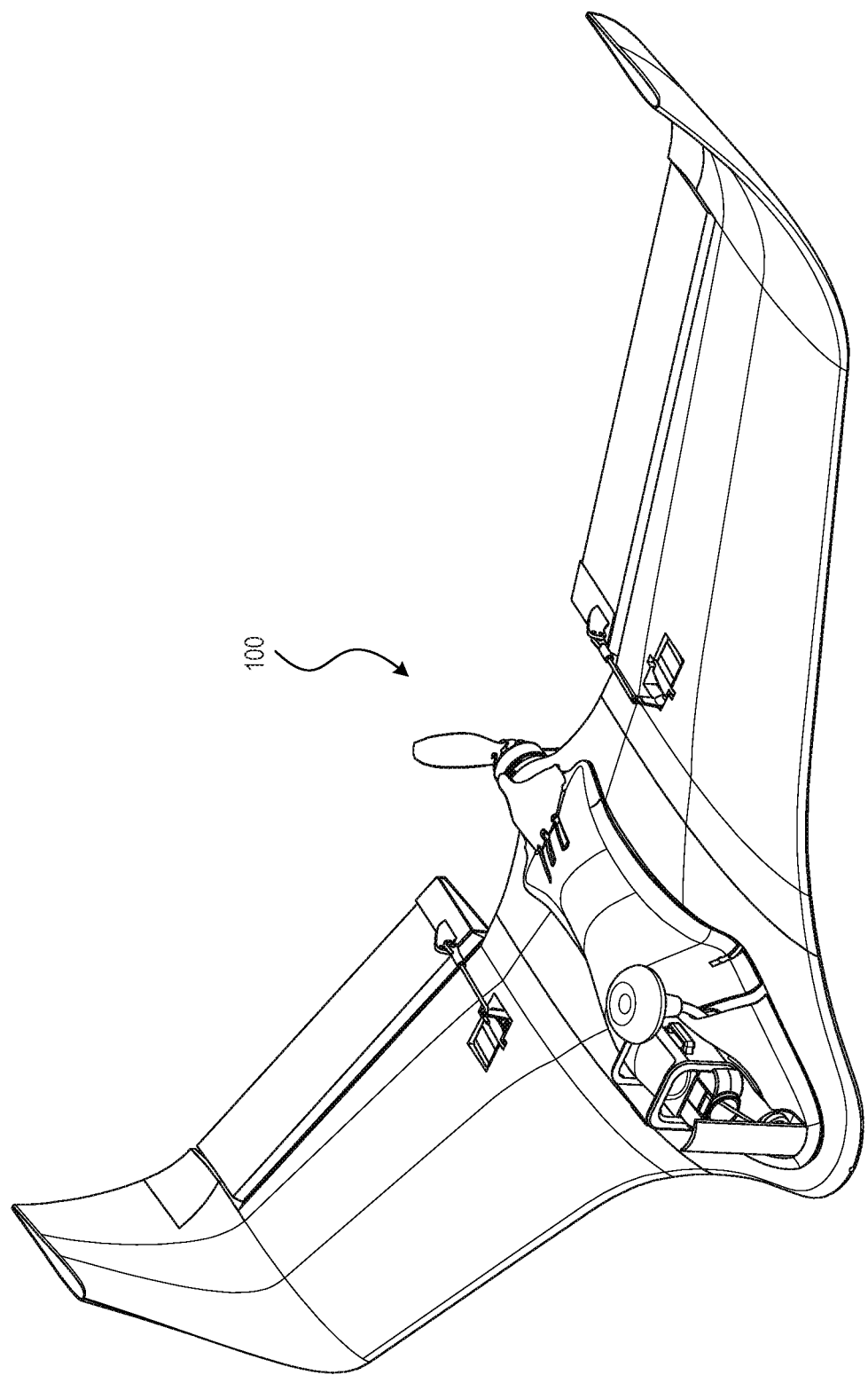
FIG. 1 illustrates a perspective view of a radio-controlled (RC) aircraft, according to an example embodiment.

FIG. 1 illustrates a perspective view of a radio-controlled (RC) aircraft, according to an example embodiment. The RC aircraft 100 is shown from a top perspective view and is shown in the locked, or connected embodiment.

Figure 2:
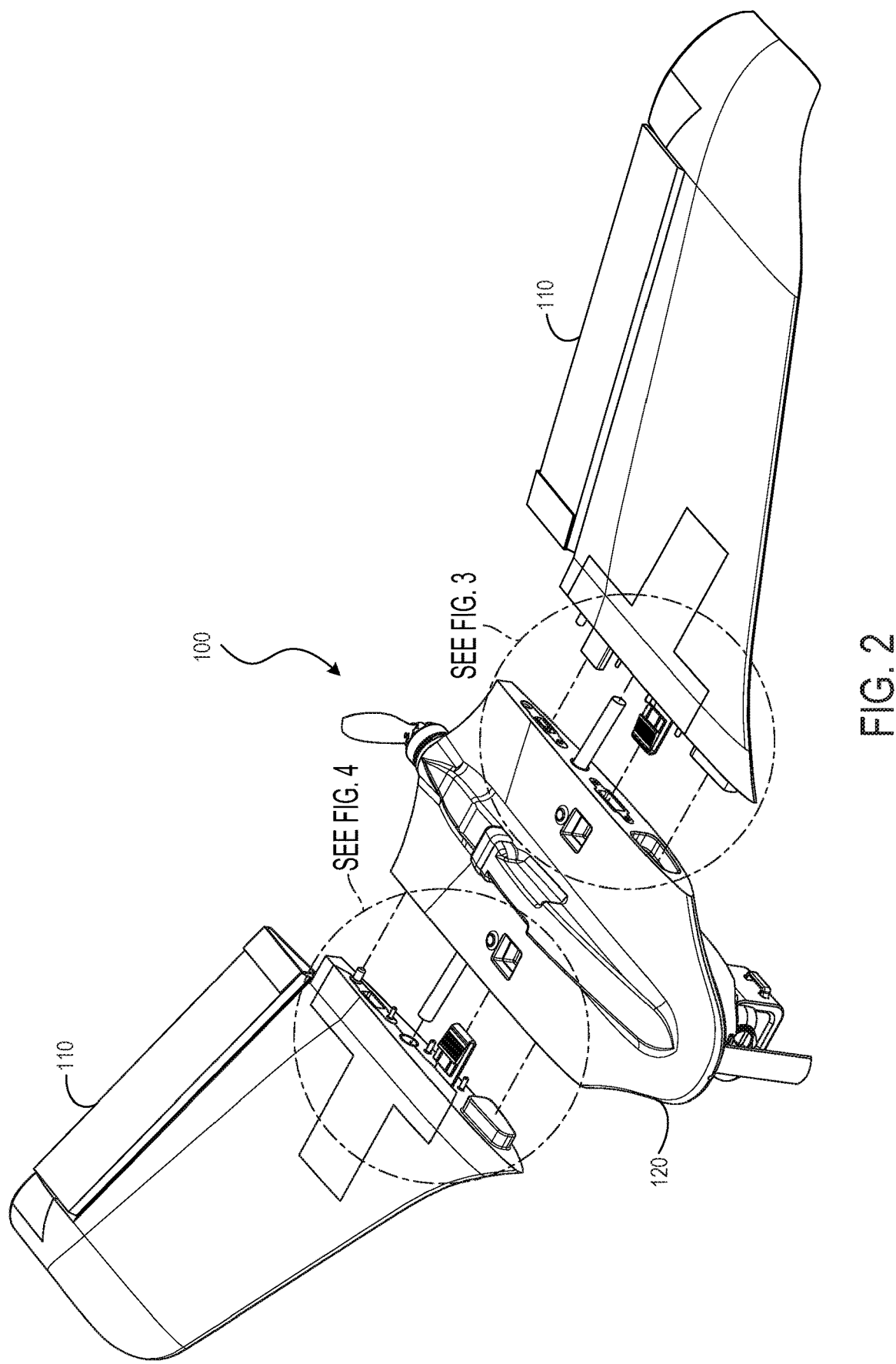
FIG. 2 is a perspective view of a RC aircraft illustrating disconnected wings, according to an example embodiment.

FIG. 2 is a perspective view of a RC aircraft illustrating disconnected wings, according to an example embodiment. FIG. 2 illustrates the RC aircraft 100, wings 110, and a fuselage 120.

Figure 3:
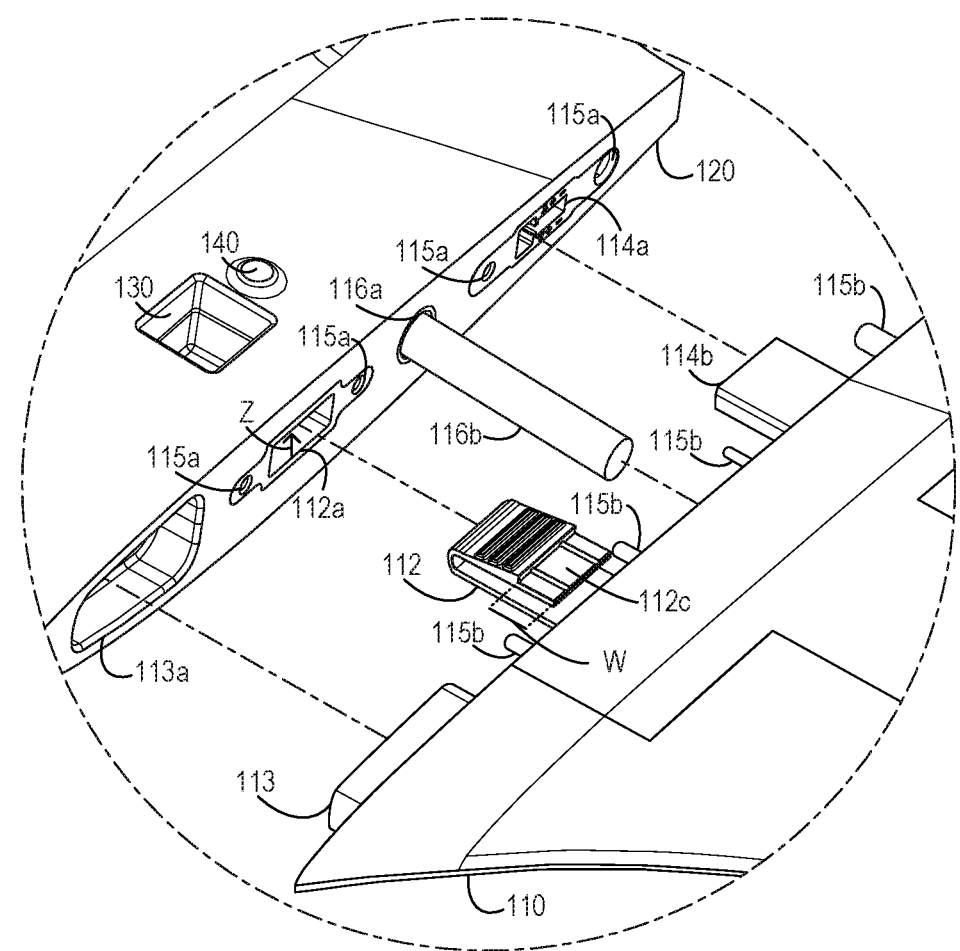
FIG. 3 is a perspective view of a portion of FIG. 2.

FIG. 3 is a perspective view of a portion of FIG. 2, according to example embodiments. FIG. 3 illustrates a portion of a wing 110 with a locking mechanism 112, a tab cut-out portion 112c of the locking mechanism 112 with a width W, a stabilizing protrusion 113, an electronics case 114b, and support rods 115b. FIG. 3 also illustrates a portion of a fuselage 120 with a locking mechanism recess 112a, a stabilizing recess 113a, an electronics aperture 114a (not necessarily drawn to scale), support rod recesses 115a, an aperture 130, a balancing point 140, and a direction Z.

In operation, when the wing 110 is connected to the fuselage 120, the wing 110 and fuselage 120 are flush and the various components all fit within the corresponding or matching recesses (e.g., as shown in FIG. 1). The lock mechanism 112 of FIG. 3 is a snap-fit joint, or snap joint, with a protruding portion above the tab cut-out portion 112 that is deflected briefly during the joining operation and catches in a locking structure, or depression in the mating component, such as the locking mechanism recess 112a. After the joining operation, the snap-fit joint, or locking mechanism 112, may return to a substantially stress-free condition. To reduce the risk of the wing disconnecting during flight, the locking mechanism 112 may be designed such that the force required to deflect the tab cut-out portion 112 is relatively high.

The lock mechanism 112 of the wing 110 shown in FIG. 3 is adapted have an outward bias (e.g., in the direction Z as shown in FIG. 3) when deflected. As shown in FIG. 3, the locking mechanism 112 is a U-shaped tab with a tab cut-out portion 112c. The locking mechanism recess 112a is configured such that it compresses the locking mechanism 112 as the locking mechanism 112 is inserted into the locking mechanism recess 112a until the locking mechanism 112 has been inserted all the way, where the locking mechanism 112 may return to a substantially stress-free condition. For example, the locking mechanism recess 112a may have a locking structure with a width W and a shape that corresponds to the shape of the tab cut-out portion 112c such that the locking mechanism 112 is locked in place after being inserted in locking mechanism 112a.

In some embodiments, a snap-fit lock mechanism is used to easily and quickly disconnect the wing 110 from the fuselage 120 without requiring the use of tools. For example in some embodiments, the wing 110 is disconnected from the fuselage 120 by unlocking the lock mechanism 112 by applying a force against the locking mechanism 112 (e.g., such as a force against the deflected bias, or opposite of the direction Z, of the U-shaped tab 112 illustrated in FIGS. 3 and 4).

Although a U-shaped tab is discussed and illustrated here for purposes of convenience, any locking mechanism can be used. For example, snap joints such as cantilever snap joints, other u-shaped snap joints, torsion snap joints, and annular snap joints may be used. Snap joints have the advantage of providing a quick disconnect or connect mechanism that does not require any tools to use and does not have any loose parts. Other joining methods may also be used in other embodiments, including methods that use any other type of joining approach.

To provide additional support, to reduce stresses (e.g., shear or angular stress), or to mitigate rotation on the wing 110 or components of the wing 110 in reference to the fuselage 110, various support components may be used. For example, the RC aircraft 100 may include one or more stabilizing mechanisms, such as the stabilizing mechanism (113, 113a) shown in FIG. 3 that includes a stabilizing protrusion 113 on the wing 110 and a stabilizing recess 113a on the fuselage 120. Of course, in some embodiments, these may be reversed such that the stabilizing protrusion 113 is on the fuselage 120 and the stabilizing recess 113a is on the wing 110.

The wing 110 may also include one or more wing support recesses 115 (illustrated in FIG. 4) that are configured to accept support rods 115b. Similarly, the fuselage 120 may include one or more fuselage support rod recesses 115a that correspond to the wing support rod recesses 115 and are configured to accept support rods 115b.

The RC aircraft 100 may include a structural member 116b, such as a fiberglass or carbon fiber structural member. The structural member 116b may provide strength to the wing. Although the structural member 116b is illustrated as a cylindrical shape, various sizes, shapes, and materials may be used for the structural member. The fuselage 120 illustrated in FIG. 3 contains a fuselage structural member recess 116a, with the structural member 116c shown inserted into the fuselage structural member recess 116a of fuselage 120. In some embodiments, the structural member may be coupled to the fuselage 120 or the wing 110, rather than being separately removable.

The RC aircraft 100 may include an electronics enclosure 114b. The electronics enclosure 114b may be hollow such that components, such as electronic or mechanical components can pass through the electronics enclosure 114b. In some embodiments, the electrical components, such as servomotor lead wires, are integrated into the wing 110 and the electronics enclosure 114b is configured with a quick-connect mechanism to plug directly into the electronics enclosure recess 114a of the fuselage 120.

The RC aircraft 100 may include one or more balancing points 140. The balancing points may be used to determine or adjust center of gravity.

Figure 4:
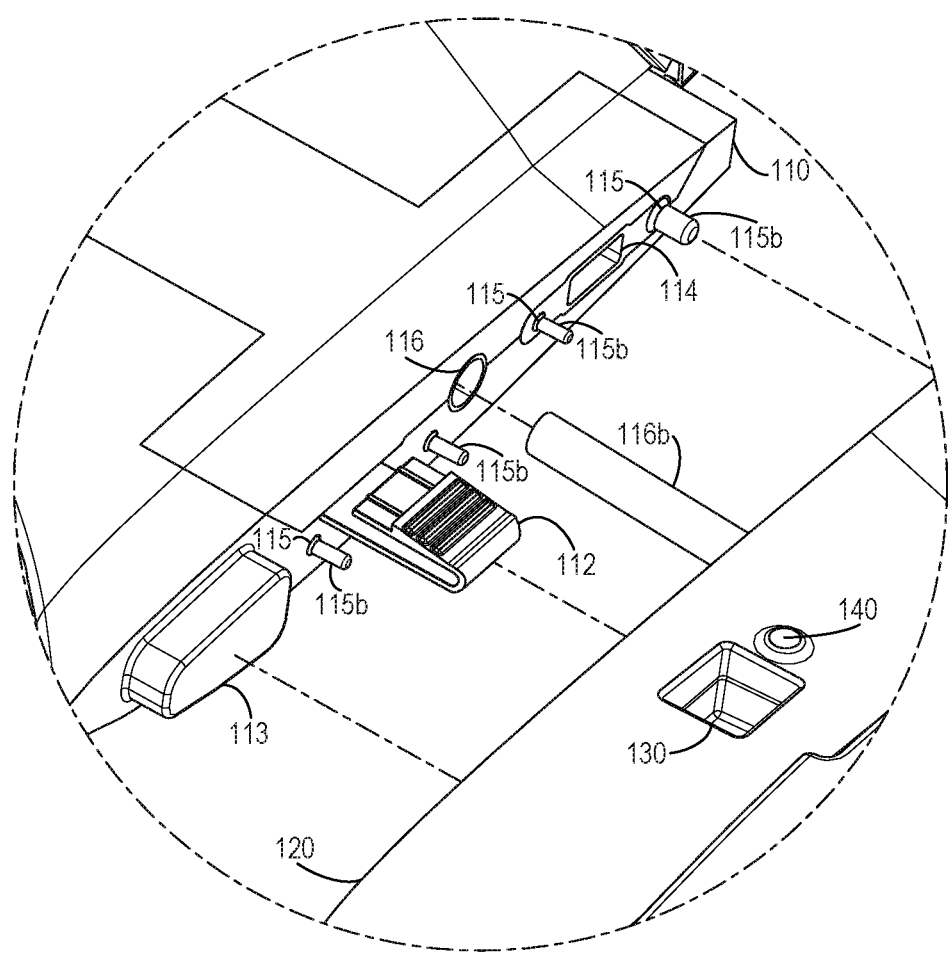
FIG. 4 is a perspective view of a portion of FIG. 2.

FIG. 4 is a perspective view of a portion of FIG. 2. The wing 110 and fuselage 120 of FIG. 4 may include all the components discussed in reference to FIG. 3, which may perform in the same or similar manners and with the same or similar alternatives.

FIG. 4 illustrates a wing 110 with a locking mechanism 112, a stabilizing protrusion 113, an electronics aperture 114, wing support rod recesses 115, support rods 115b, and a wing structural member recess 116. FIG. 4 also illustrates a fuselage 120 with an aperture 130, and a balancing point 140 that is coupled to structural member 116b.

While particular aspects and embodiments are disclosed herein, other aspects and embodiments will be apparent to those skilled in the art in view of the foregoing teaching. For example, while the embodiments are described with respect to applications for RC aircraft, the disclosed systems and methods are not so limited. Further, while certain shapes, sizes, and materials are described, the disclosed systems and methods are not so limited. The various aspects and embodiments disclosed herein are for illustration purposes only and are not intended to be limiting, with the true scope and spirit being indicated by the following claims.

We claim:

1. A radio-controlled (RC) aircraft comprising:
   a structural member;
   a wing configured to disconnect from a fuselage, the wing comprising:
      a lock mechanism coupled to the wing and adapted to fit within a lock recess of the fuselage;
      a wing structural member recess configured to receive the structural member; and
   wherein the fuselage comprises:
      a fuselage structural member recess that corresponds to the wing structural member recess;
      a lock recess adapted to receive the lock mechanism; and
      an aperture adapted to provide access to the lock mechanism;
   wherein the wing is disconnected from the fuselage by unlocking the lock mechanism; and
   wherein the structural member is adapted to fit within the wing structural member recess and the fuselage structural member recess.

2. The RC aircraft of claim 1, further comprising a stabilizing mechanism adapted to prevent rotation of the wing when the wing is connected to the fuselage.

3. The RC aircraft of claim 2, wherein the stabilizing mechanism comprises:
a stabilizing protrusion on the wing adapted to fit within a stabilizing recess on the fuselage.

4. The RC aircraft of claim 1, wherein the lock mechanism is a biased lock mechanism such that the wing is disconnected from the fuselage by applying a force against the bias of the biased lock mechanism.

5. The RC aircraft of claim 4, wherein the biased lock mechanism is a U-shaped tab with an outward bias and a tab cut-out portion;
wherein the lock recess further comprises a locking structure that corresponds to the tab cut-out portion; and
wherein the wing is connected to the fuselage at least in part when the lock recess receives the U-shaped tab and the lock recess compresses the U-shaped tab against the outward bias until the tab cut-out portion passes the locking structure of the lock recess such that the outward bias of the U-shaped tab presses the tab cut-out portion against the locking structure and connects the wing to the fuselage.

6. The RC aircraft of claim 1, wherein the wing and the fuselage each further comprise matching support rod recesses; and
wherein the RC aircraft further comprises a support rod adapted to fit within the matching support rod recesses of the wing and fuselage.

7. The RC aircraft of claim 1, wherein the wing and the fuselage each comprise a plurality of matching support rod recesses;
wherein the RC aircraft further comprises a plurality of support rods adapted to fit within the matching support rod recesses; and
wherein at least two of the matching support rod recesses are positioned on either side of the lock mechanism.

8. The RC aircraft of claim 1, further comprising a wing electronics aperture and a fuselage electronics aperture.

9. A radio-controlled (RC) aircraft with a removable wing comprising:
a snap-fit locking mechanism coupled to the removable wing and a fuselage;
a structural member coupled to the removable wing and the fuselage;
an aperture adapted to provide access to the snap-fit lock mechanism, and a stabilizing mechanism comprising:
a stabilizing protrusion on either the wing or the fuselage; and
a corresponding stabilizing recess on the other of the wing or the fuselage adapted to receive the stabilizing protrusion when the wing is connected to the fuselage;
wherein the wing is disconnected from the fuselage by applying a force to the snap-fit locking mechanism.

10. The RC aircraft of claim 9, wherein the removable wing and the fuselage further comprise a wing electronics aperture and a corresponding fuselage electronics aperture.

11. The RC aircraft of claim 9, wherein the removable wing and the fuselage each further comprise matching support rod recesses; and
wherein the RC aircraft further comprises a support rod adapted to fit within the matching support rod recesses of the removable wing and fuselage.

12. The RC aircraft of claim 9, wherein the removable wing and the fuselage each comprise a plurality of matching support rod recesses;
wherein the RC aircraft further comprises a plurality of support rods adapted to fit within the matching support rod recesses; and
wherein at least two of the matching support rod recesses are positioned on either side of the snap-fit locking mechanism.

13. The RC aircraft of claim 9, further comprising a balancing point.

14. A radio-controlled (RC) aircraft comprising:
a structural member;
a fuselage comprising:
a lock mechanism adapted to fit within a lock mechanism recess of a wing;
a fuselage structural member recess;
a wing configured to disconnect from a fuselage, the wing comprising:
the lock mechanism recess;
a wing structural member recess configured to receive the structural member and that corresponds to the fuselage structural member recess; and
a wing aperture adapted to provide access to the lock mechanism;
wherein the wing is disconnected from the fuselage by unlocking the lock mechanism; and
wherein the structural member is adapted to fit within the wing structural member recess and the fuselage structural member recess.

15. The RC aircraft of claim 14, further comprising a stabilizing mechanism adapted to prevent rotation of the wing when the wing is connected to the fuselage.

16. The RC aircraft of claim 15, wherein the stabilizing mechanism comprises:
a stabilizing protrusion on the fuselage adapted to fit within a stabilizing recess on the wing.

17. The RC aircraft of claim 14, wherein the lock mechanism is a biased lock mechanism such that the wing is disconnected from the fuselage by applying a force against the bias of the biased lock mechanism.

18. The RC aircraft of claim 17, wherein the biased lock mechanism is a U-shaped tab with an outward bias and a tab cut-out portion;
wherein the lock recess further comprises a locking structure that corresponds to the tab cut-out portion; and
wherein the wing is connected to the fuselage at least in part when the lock recess receives the U-shaped tab and the lock recess compresses the U-shaped tab against the outward bias until the tab cut-out portion passes the locking structure of the lock recess such that the outward bias of the U-shaped tab presses the tab cut-out portion against the locking structure and connects the wing to the fuselage.

19. The RC aircraft of claim 14, wherein the wing and the fuselage each further comprise matching support rod recesses; and
wherein the RC aircraft further comprises a support rod adapted to fit within the matching support rod recesses of the wing and fuselage.

20. The RC aircraft of claim 14, further comprising a wing electronics aperture and a fuselage electronics aperture.

* * * * *